United States Patent [19]

Suzuki et al.

[11] 4,098,510
[45] Jul. 4, 1978

[54] RECORD PLAYER

[75] Inventors: Toru Suzuki, Chigasaki; Masao Toyosawa; Chiaki Toyoda, both of Tokyo, all of Japan

[73] Assignee: Sony Corporation, Tokyo, Japan

[21] Appl. No.: 771,752

[22] Filed: Feb. 24, 1977

[30] Foreign Application Priority Data

Mar. 2, 1976 [JP] Japan .................. 51-21823
Mar. 6, 1976 [JP] Japan .................. 51-26918[U]

[51] Int. Cl.² .................. G11B 3/00; G11B 25/04
[52] U.S. Cl. .................. 274/9 B; 274/10 E; 274/13 R; 274/39 R
[58] Field of Search .................. 274/9 A, 9 B, 10 E, 274/15, 39, 14, 13, 10 R; 360/97, 98, 99

[56] References Cited

U.S. PATENT DOCUMENTS

| 1,802,830 | 4/1931 | Pittman | 274/10 E |
| 2,485,575 | 10/1949 | Deaver | 274/9 B |
| 2,488,260 | 11/1949 | Ascoli | 274/15 R |
| 2,973,966 | 3/1961 | Bura | 274/10 R |
| 3,570,318 | 3/1971 | Nakadaira | 274/9 A |
| 3,802,710 | 4/1974 | Mazza | 274/9 B |
| 3,804,422 | 4/1974 | Kobashi et al. | 274/39 R |
| 3,966,330 | 6/1976 | Ridler et al. | 274/39 R |

FOREIGN PATENT DOCUMENTS

274,431  5/1913  Fed. Rep. of Germany ..... 274/39 R

Primary Examiner—Richard E. Aegerter
Assistant Examiner—John W. Shepperd
Attorney, Agent, or Firm—Lewis H. Eslinger; Alvin Sinderbrand

[57] ABSTRACT

A record player including a housing enclosing a turntable with the housing provided with a slot for receiving a disc record which is transported to the turntable and automatically centered thereon. In addition, the record player includes means to detect the insertion of the record, means for detecting the size of the record and means for adjusting the r.p.m. of the turntable according to the size of the record detected.

9 Claims, 10 Drawing Figures

RECORD PLAYER

BACKGROUND OF THE INVENTION

1. Field of the Invention

This invention relates to a record player, and more particularly to a novel record player having a loading mechanism for automatically positioning or placing a disc record on a turntable.

2. Description of the Prior Art

As is well known in the art, a record player includes a turntable supported on a center spindle. However, some troublesome efforts may be encountered when attempting to place a disc record on the turntable manually. To overcome this difficulty there have been proposed attempts, such as disclosed in U.S. Pat. No. 3,488,059, in which a slot is provided in a housing which encloses a turntable therein. The disc record is inserted into the slot, so that the disc record may be placed on the turntable. In addition, guides are provided to position the disc record on the turntable. This type of guide, however, is only partially successful because of the difficulty in bringing disc records of varying sizes to the turntable using only a single guide means. Another difficulty with this type of record player is encountered when a disc record of a smaller size is used because the width of the entrance slot is designed so as to be reduced in proportion to the size of the disc record. Thus, the disc record cannot be inserted into the housing in a satisfactory manner.

Another type of the prior art record player is disclosed in U.S. Pat. No. 3,966,330, in which there is disclosed an automatic record player having means for optically detecting the size of a disc record, so that the drop point of the tone arm i.e., the stylus, relative to a disc record may be determined. However, detection of the size of a disc record is accomplished on the turntable, thereby creating an undesirable load on the record or requiring the provision of additional accessories for the turntable to facilitate the detection of record size.

SUMMARY OF THE INVENTION

It is accordingly an object of the present invention to provide a record player which avoids the shortcomings experienced with the prior art record players.

It is another object of the present invention to provide a record player which places a disc record on a turntable automatically.

It is a further object of the present invention to provide a record player which includes means for automatically centering a disc record on a turntable.

It is a still further object of the present invention to provide a record player which includes a housing having a slot, and a turntable housed in the housing, a mechanism for placing a disc record which has been inserted into the housing on the turntable and a mechanism for centering the record on the turntable.

It is yet a still further object of the present invention to provide a record player which includes a mechanism for properly positioning disc records having varying sizes on a turntable.

It is a further object of the present invention to provide a record player which may automatically initiate record play and which utilizes record size detectors to automatically select proper record speed and positioning of the record stylus.

It is a further object of the present invention to provide a record player which provides record size detecting means of a simplified construction without requiring incorporating any special means in the turntable.

It is a further object of the present invention to provide a record player which may accurately detect the size of a disc record without regard to the initial position of a disc record inserted in the player.

It is a further object of the present invention to provide a record player in which record size indicating means is provided to be actuated by record size detecting means thereby to indicate the size of a record to the user.

DESCRIPTION OF THE PREFERRED EMBODIMENTS

Figure 1:
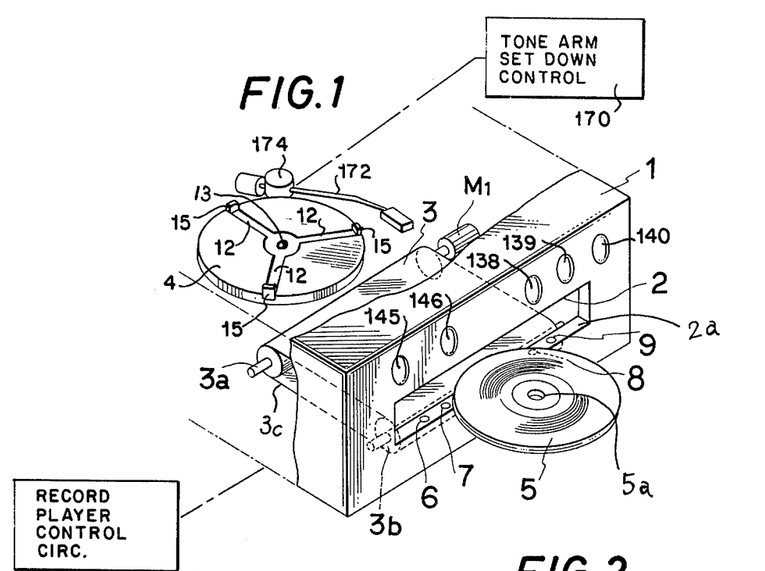
FIG. 1 is a perspective view of part of a record player constructed according to the present invention.

Referring now to FIG. 1, there is shown part of a record player according to the present invention which includes a housing 1 of a disc record player. The housing 1 is provided with a disc record inserting slot 2 on one side of the housing in the form of an elongated through-hole. Within housing 1 adjacent slot 2 is a transport or carrying mechanism 3 which includes a surface continuous with the lower inner side 2a of disc record inserting slot 2. Transport mechanism 3 may be driven in any appropriate manner, such as by drive rollers 3a, 3b mechanically coupled to a motor M to drive a continuous belt 3c. Belt 3c of transport mechanism 3 conveys a disc record 5 to a rotatably driven mechanism or turntable 4 for rotation thereon during record play. Positioned within the surface of lower side 2a of record inserting slot 2 are a plurality of detecting means 6 to 9 for detecting the size of a disc record inserted within slot 2. Detecting means 6 to 9 may be any appropriate device such as micro-switches, photoelectric elements or the like.

Figure 2:
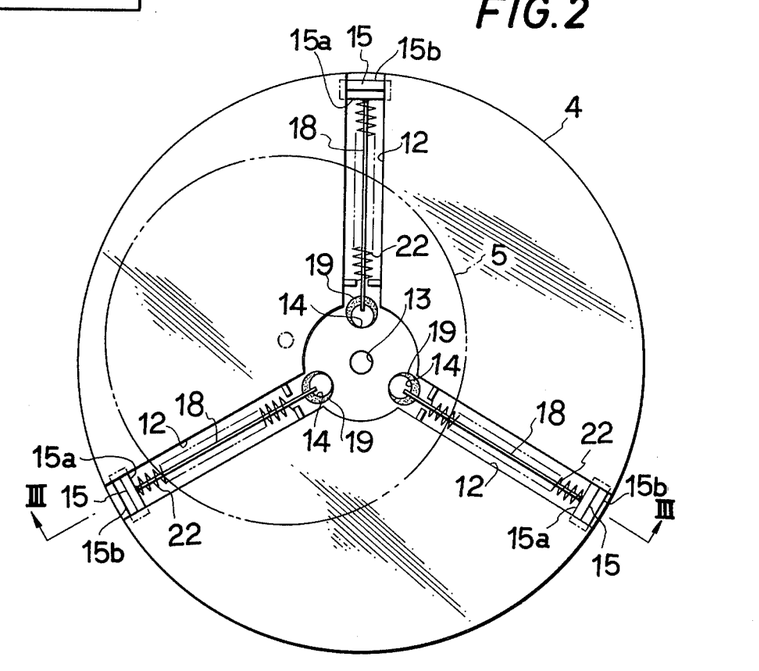
FIG. 2 is a plan view of a turntable for use in a record player according to the present invention.
Figure 3:
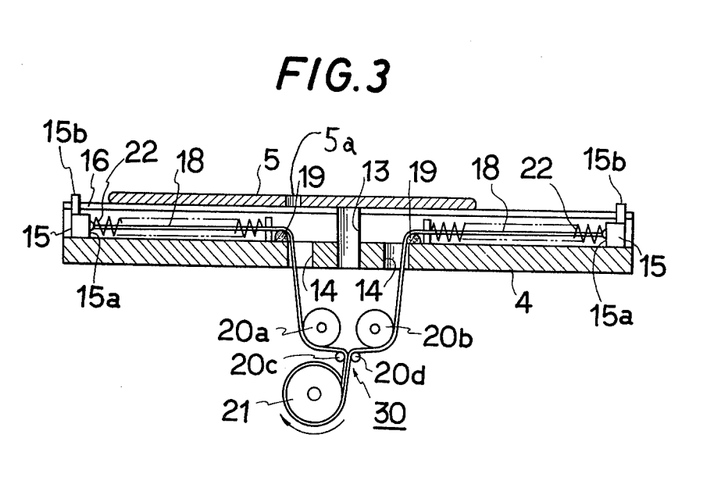
FIG. 3 is a cross-sectional view of the turntable, taken along the line III—III of FIG. 2.

Referring now to FIGS. 2 and 3, the record player of the present invention includes guide channels 12 provided in the top surface of the turntable 4 in three positions at an angular spacing of 120° with respect to the center hole 13 of turntable 4 and extending radially and linearly therefrom. When a disc record 5 is brought to a centered position on the turntable 4, a center shaft (not shown) is inserted into the center hole of the record from above or below the turntable 4.

Figure 4:
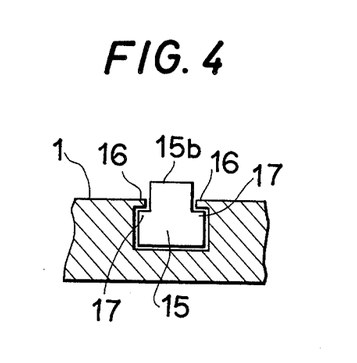
FIG. 4 is an enlarged cross-sectional view of part of the turntable of FIG. 3.

At the radially inward end of each guide channel 12 around center hole 13 are provided through holes 14 to permit access for control means for the record centering mechanism. This centering mechanism includes slidable guide members 15 having an L-shaped cross section which are fitted for reciprocating sliding movement in respective guide channels 12. Each guide member 15 is formed with record edge engaging portions 15b and, as shown in FIG. 4, also include a flanged base portion 17. Flanged portions 17 of guide members 15 are so designed as to fit within guide channels 12 and are guided by the opposed extending lip portions 16 defining the opposed edges of the openings of guide channels 12. In this manner flanged portions 17 of guide members 15 restrain movement of the guide members out of guide channels 12 while permitting movement along the length of the guide channels.

Each guide member 15 has a cord 18 tied to the inner lower surface 15a so that the guide members 15 may be drawn towards center hole 13 when cords 18 are drawn. Cords 18 form part of a centering mechanism 30 and run or pass over smooth guide surface 19 attached to the peripheral extent of through holes 14 through these holes, then about idler pulleys 20a, 20b positioned below through holes 14, then between rollers or guide members 20c, 20d to be joined together, and finally to be wound around a take-up pulley 21. Accordingly, when the take-up pulley 21 is rotated in the direction to wind chords therearound, either manually or by a motor, the respective guide members 15 are smoothly guided so as to slidingly move along guide channels 12 towards center hole 13. The disc record 5 is guided towards the center hole 13, as will be described hereinafter, by a centering means comprising guide members 15, roller 21, and cords 18 secured to guide members 15 as well as to roller 21. The lengths of each of the cords 18 which draw guide members 15 toward center hole 13 are selected so that guide members 15 may be spaced given equal distances from the center hole 13. As a result, the movement of each guide member 15 as measured from take-up pulley 21 is maintained uniform and equal to each other guide member 15 whether cords 18 are in a winding condition or an unwinding condition from take-up pulley 21. To obtain sliding movement in a radially outward direction for guide members 15 tension springs 22 are provided as shown in FIG. 3, to urge the guide members 15 in a radially outward direction. Thus with cords 18 unwound from take-up pulley 21, the guide members 15 are urged outwardly to the outer peripheral portion of turntable 4. This is the orientation of guide members 15 before a disc record is transported onto the turntable 4.

Turning now to a description of the centering operation of a disc record on turntable 4, a disc record 5 is first inserted through the slot 2, and carried by transport mechanism 3 to turntable 4. During this sequence the size of disc record 5 is determined by means of disc record detecting means which will be described hereinafter. After transport mechanism 3 deposits a disc record 5 on turntable 4, a motor (not shown) is driven to rotate take-up pulley 21 in a direction to wind cords 18 therearound. Cords 18 are drawn past guide members 19 and wound around pulley 21. Guide members 15 are drawn towards the center hole 13 against the force of compression springs 22. As noted above, the movement of each of the guide members 15 are maintained equal.

During this record centering step it is evident that, as viewed in FIG. 3, guide member 15 positioned on the left side shifts disc record 5 to the right from a leftwardly biased position, with its record edge engaging portion 15b in abutting contact with the edge of disc record 5. In this manner the center hole 5a in disc record 5 may be brought into register with center hole 13 in turntable 4. After record 5 has been centered on turntable 4 with center hole 5a in register with center hole 13, a center shaft (not shown) is inserted therethrough so as to properly center the disc record on the turntable. Simultaneously therewith, turntable 4 may be driven by means of a drive system associated with the center shaft. Turntable 4 is thus rotated, with the disc record 5 retained by guide members 15. Alternatively, guide members 15 may be disengaged from contact with record 5 and record 5 rotated on turntable 4 as is conventional with most record players. It is also to be understood that the centering means may be provided on a stationary table below turntable 4, with turntable 4 positioned to rotate within the stationary table. Such an alternative would simplify the construction of the rotatable turntable itself and, hence, the maintenance and checking of such a record player.

Table 1 below shows the types and nominal outer diameters of disc records in common usage. Disc records of these sizes are detected by a mechanism in the record player of the present invention. The size of a record is detected in the course of the record being carried by the transport mechanism onto the turntable.

Table 1

| Nominal outer diameter | 17cm | 25cm | 30cm |
|---|---|---|---|
| Outer diameter of disc record | 175 ± 1mm | 251 ± 2mm | 301 ± 2mm |

Figure 5:
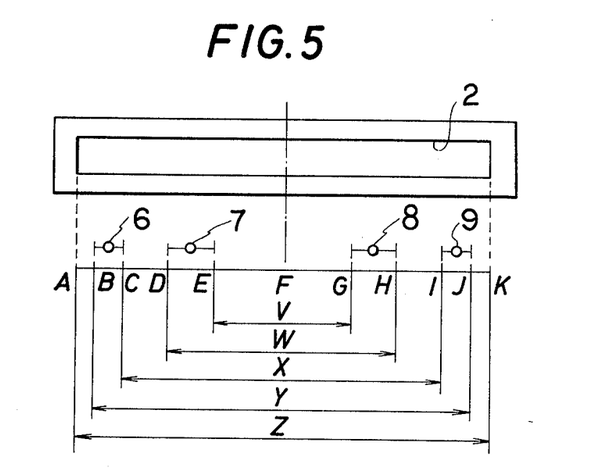
FIG. 5 is a view showing the positional relationship between a disc record inserting slot and photosensors used to detect record size.
Figure 6:
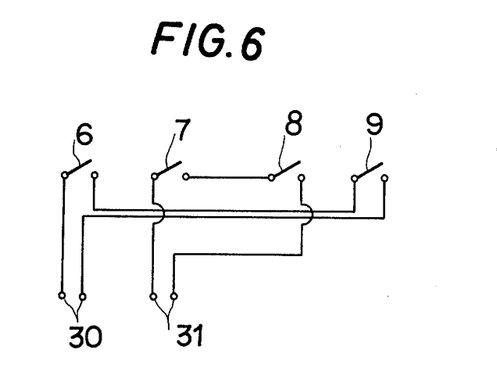
FIG. 6 is a circuit diagram for the photosensors of FIG. 5.

The detecting means 6 to 9 shown in FIGS. 1, 5, 6 are so spaced as to be capable of detecting records of the various sizes shown in Table 1. In practice, the width of the inserting slot 2 should be selected to have a dimension which is not excessively large but large enough to accommodate the largest diameter record to be used.

As shown in FIG. 5, assume that a distance A–K, i.e., the width of the slot 2 is Z, reasonable ranges of detecting means 6 and 9 are B–C and I–J, such that the detecting means 6 and 9 may be spaced from the center of the slot equally, and reasonable ranges of detecting means 7 and 8 are D–E and G–H, respectively. The distance or width Z of the slot, as noted above, should be such as to allow the insertion of a disc record of a maximum outer diameter of 303 mm therein but to prevent the insertion of two disc records of an outer diameter of 17-cm in parallel relation, i.e., the disc record of an outer diameter of 17-cm should cover over half the width Z of the slot, when the record is guided along one of the side walls of slot 2. In other words, 303 mm ≦ Z < 322 mm. A distance X between C and I and a distance Y between B and J are selected so as to detect a disc record of a maximum diameter of 25-cm and a disc record of a minimum diameter of 30-cm. In other words, 253 mm < X < Y < 598 mm - Z. In like manner, a distance W between D and H and a distance V between E and G are selected so as to detect a disc record of a minimum diameter of 25-cm and a disc record of a maximum diameter of 17-cm, respectively. In other words, 176 mm < V < W < (498 mm - Z). Shown at F is the mid point of slot 2. The above distances are so selected so that when a disc record is inserted through the inserting slot 2 the number of the detecting means to detect the record size may be minimized. The detecting procedure will be described in more detail with reference to the circuit diagram shown in FIG. 6.

In the case where a disc record of 30-cm is inserted into slot 2 having detecting means 6 to 9, all of the detecting means 6 to 9 are brought to closed positions so that detecting signals are derived at output terminals 30, 31. On the other hand, in the case where a 25-cm record is inserted into slot 2, then detecting means 7 and 8 are both brought to closed positions and, in this case, either one but not both of detecting means 6 and 9 may also be brought to a closed position. Thus for a 25-cm record, a detecting signal is derived only at output terminal 31. In the case where a 17-cm disc record is inserted, the disc record is preferably positioned within the distance V where it may bring either one of the detecting means 7 and 8 to a closed position. If a 17-cm disc record is positioned to one side or the other of slot 2 it may bring either pair of the detecting means 6-7 or 8-9, but not both, to a closed position. In this latter case, a detecting signal is not derived at either of the output terminals 30, 31. Signal codes for the detecting means 6 to 9 are shown in Table 2. Detecting informations shown therein are fed to an operation circuit for detecting the sizes of disc records.

Table 2

| Size of disc record Detecting means | 30cm | | 25cm | | 17cm | | |
|---|---|---|---|---|---|---|---|
| 6 | 1 | 0 | 1 | 0 | 1 | 0 | 0 |
| 7 | 1 | 1 | 1 | 1 | 1 | 0 | 0 |
| 8 | 1 | 1 | 1 | 1 | 0 | 1 | 0 |
| 9 | 1 | 0 | 0 | 1 | 0 | 1 | 0 |

Figure 7:
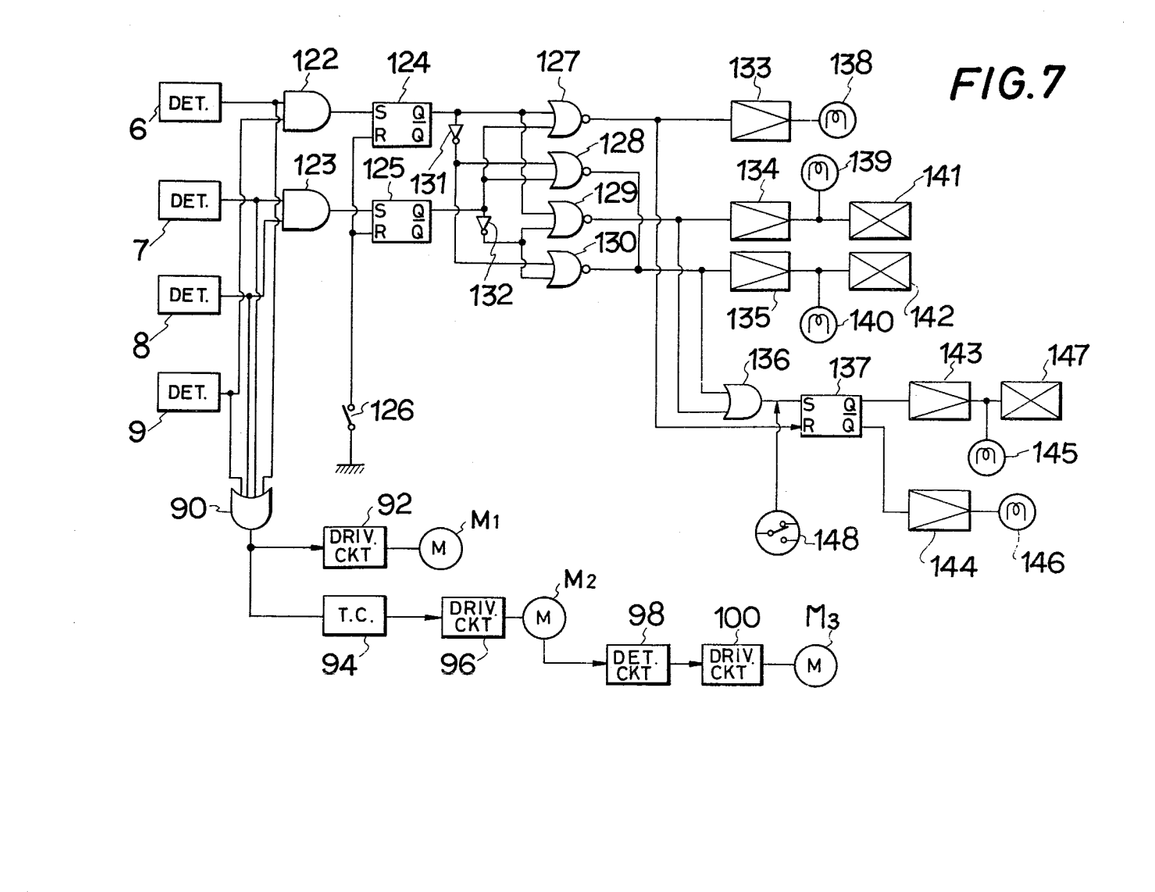
FIG. 7 is a block diagram of a system, in which outputs of photosensors are computed and a lead-in position of a tone arm and r.p.m. of a turntable may be determined according to the size of a disc record.

The block diagram shown in FIG. 7 illustrates the circuit for controlling the drive motor M, of the transport mechanism 3, a drive motor $M_2$ for the centering mechanism 30 and a drive motor $M_3$ for turntable 4, and an operation circuit for detecting the size of a disc record and accordingly determining the set down position of the tone arm and the rotational speed of the turntable.

As shown in FIG. 7, outputs of the respective detecting means 6 to 9 are supplied to an OR gate 90, and then an output of the OR gate 90 is supplied to a driving circuit 92 for motor $M_1$ (FIG. 1). Accordingly, when a disc record is inserted into the slot 2, motor $M_1$ is driven due to an output of outputs of either one, or a plurality of, detecting means to activate transport mechanism 3. As a result, disc record 5 is transported from slot 2 to turntable 4.

At the same time, an output terminal of OR gate 90 is connected by way of a timing circuit 94 to a driving circuit 96 for a motor $M_2$ adapted to drive take-up pulley 21 (FIG. 3). Timing circuit 94 may comprise, by way of example, a time-constant circuit, which may supply an output to a driving circuit 96 a given time after an output of the OR gate 90 has been produced. This delayed time corresponds to the duration of time from the time when a disc record 5 is first inserted into the slot 2 until the disc record 5 is placed on turntable 4. After disc record 5 has been positioned on turntable 4, the motor $M_2$ is energized through driving circuit 96 and take-up pulley 21 is rotated. As described above, this draws guide members 15 towards the center of turntable 4 to center record 5. After record 5 is centered, guide members 15 are locked on the peripheral edge of record 5, that is, the record prevents further movement of members 15 toward the center of the turntable. As a consequence, an increased load is imposed on motor $M_2$ through the medium of cords 18 and pulley 21. The increased load thus applied is detected by a suitable motor load detecting circuit 98, and the detected output thus obtained is supplied to a driving circuit 100 for a motor $M_3$ adapted to drive turntable 4. In this manner, the rotation of turntable 4 is started after record 5 has been completely centered on turntable 4.

The operation circuit for the detecting signals to detect the size of a disc record will now be described with reference to FIG. 7. Output terminals of the detecting means 6 and 9 are connected to an AND gate 122, while output terminals of the detecting means 7 and 8 are connected to an AND gate 123. Output terminals of the AND gates 122 and 123 are connected to S-terminals of R-S (reset-set) flip-flop circuits 124 and 125, respectively. R-terminals of the R-S flip-flop circuits 124 and 125 are grounded through a reset switch 126. In addition, a Q-terminal of the R-S flip-flop circuit 124 is connected to NOR gates 127, 129 and by way of an inverter 131 to NOR gates 128, 130, respectively. A Q-terminal of R-S flip-flop circuit 125 is connected to NOR gates 127, 128 and by way of an inverter 132 to NOR gates 129, 130, respectively. An output terminal of the NOR gate 127 is connected to a lamp driving circuit 133 for a lamp 138, to indicate a 17-cm disc record, and to an R-terminal of an R-S flip-flop circuit 137. In addition, output terminals of NOR gates 128, 130 are connected jointly to input terminals of a driving circuit 135 for a lamp 140, to indicate a 30-cm disc record, and to an OR gate 136. An output terminal of the NOR gate 129 is connected to input terminals of a driving circuit 134 for a lamp 139, to indicate a 25-cm disc record, and to OR gate 136. Driving circuits 134 and 135 also control plungers or solenoids 141, 142, respectively, to control the position of the record tone arm as will be described more fully hereinbelow. An output terminal of OR gate 136 is connected to an S-terminal of a flip-flop circuit 137, while one Q-terminal of flip-flop circuit 137 is connected to a driving circuit 143 for a lamp 145, to indicate that a disc record is of the 33 r.p.m. type, and a plunger or solenoid 147 to control r.p.m. of the turntable as will be explained more fully hereinbelow. The $\overline{Q}$-terminal of flip-flop circuit 137 is connected to a driving circuit 144 for a lamp 146 to indicate that a disc record is of the 45 r.p.m. type. At 148 is shown a switch for changing the rotational speed of motor 182 manually from 33 r.p.m. to 45 r.p.m. as may be desired.

A description will now be given of the operations of the circuits thus arranged. In a first instance, when a 30-cm disc record 5 is inserted into slot 2, detecting means 6 to 9 are activated so that, as shown in Table 2, detecting outputs produced are all "1". Accordingly, the outputs of AND gates 122, 123 are both turned to "1" and then supplied to the S-terminals of R-S flip-flop circuits 124, 125 so that "1" outputs are derived from the Q-terminals thereof, respectively. An output "1" is derived from NOR gate 130 alone to operate driving circuit 135 to light lamp 140, thereby indicating that a disc record is of 30-cm type. In addition, this energizes plunger or solenoid 142 to switch a suitable size selector mechanism 170 for the tone arm (FIG. 8) from a 17-cm position to a 30-cm position, thereby setting a drop point for the tone arm.

An output "1" of the NOR gate 130 operates OR gate 136 so that a signal therefrom is applied to the S-terminal of R-S flip-flop circuit 137. An output signal is derived from the Q-terminal of circuit 137 to operate the driving circuit 143 and light lamp 145 to indicate that a disc record is of the 33 r.p.m. type. In addition, plunger or solenoid 147 is energized to cause a suitable speed selecting mechanism (not shown) to change the rotational speed of the turntable from 45 r.p.m. to 33 r.p.m. In this manner, the changing operation to accommodate a record size of 30-cm as well as changing operation to 33 r.p.m. is automatically accomplished. However, since the r.p.m. of a disc record is not always constant, with respect to the size of a record, manually operable switch 148 is provided so as to enable the user to the set r.p.m. to a proper value.

In the case where a 17-cm disc record is inserted into slot 2, as is clear from Table 2, no output is derived from AND gates 122, 123, and R-S flip-flop circuits 124, 125, so that an output "1" may be derived only at NOR gate 127, to which have been fed two "0" signals. The result is that driving circuit 133 is operated to light lamp 138 thereby indicating that a disc record is of 17-cm type. R-S flip-flop circuit 137 remains in a reset condition so that an output is taken from the $\overline{Q}$-terminal of circuit 137 to operate driving circuit 144 for lamp 146 thereby indicating that a disc record is being driven at 45 r.p.m.

Finally, in the case of a 25-cm disc record, as is clear from Table 2, an output "1" is produced only at AND gate 122, so that an output "1" is derived from the Q-terminal of R-S flip-flop circuit 124. Accordingly, NOR gate 129 alone may be operated. An output "1" of NOR gate 129 operates driving circuit 134 to light lamp 139 thereby indicating that the disc record is of 25-cm type. In addition, plunger 141 is energized so as to switch the tone arm position selector from a position corresponding to a 17-cm disc record to a position corresponding to a 25-cm disc record. Furthermore, an output of NOR gate 129 operates OR gate 136 to set R-S flip-flop circuit 137. Accordingly, driving circuit 143 is operated to light lamp 145 thereby indicating that a disc record is being driven at 33 r.p.m. In addition, plunger 147 is energized to change the r.p.m. of turntable 4 from 45 to 33 r.p.m.

Figures 8, 9:
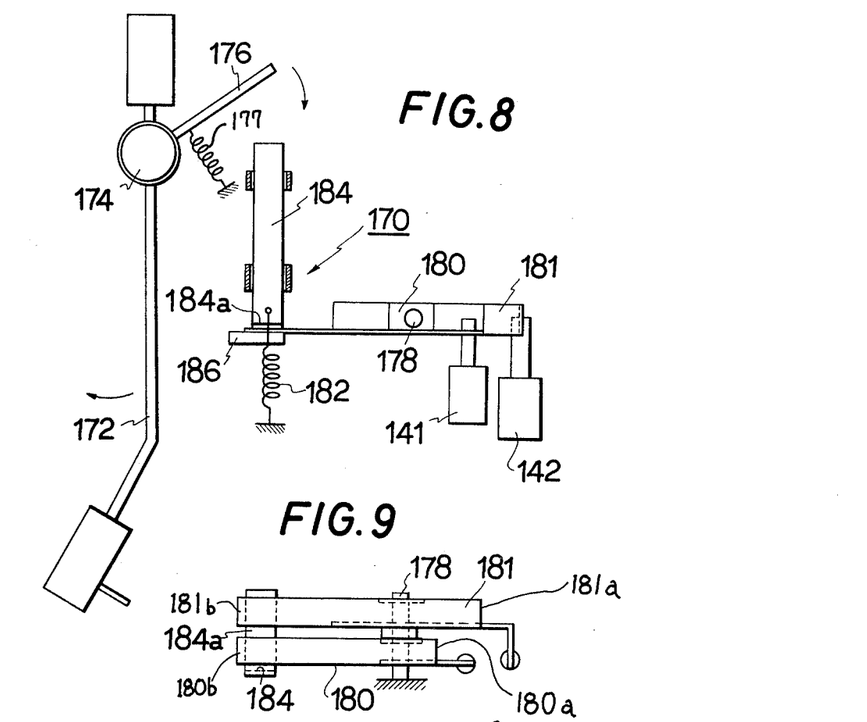
FIG. 8 is a plan view of one embodiment of a position selector for a phonograph tone arm.
FIG. 9 is a front view of part of the position selector of FIG. 8.

Referring now to FIG. 8 there is shown a schematic arrangement of only so much of the tone arm position selector 170 as is necessary for an understanding of this invention. It will be understood that, apart from the schematically illustrated arrangement, the tone arm 172 may be provided with a conventional tone arm operating mechanism (not shown) for effecting the necessary lead-in movements on initiating a playing operation and for effecting the return movements of the tone arm 172 back to its rest position at the completion of a play operation. As shown, the tone arm 172 is conventionally supported on a shaft 174 and is free to move horizontally and vertically. Tone arm 172 is provided with a set-down or lead-in position limiting lever 176 biased by a spring member 177 in the direction indicated by the arrow. Two seesaw levers 180, 181 are pivotally supported on a shaft 178 and are disposed parallel to each other, as shown in FIG. 9. Coupled to one end 180a and 181a, respectively, of the levers 180 and 181 are the plungers 141 and 142, respectively, shown in FIG. 7. The respective other ends 180b and 181b of the levers 180 and 181 are flat and contact a bent-leg 184a of a slide plate 184 which is biased against ends 180b and 181b by a spring 182, as shown in FIG. 8. The upper end 184b of slide plate 184 faces lever 176 of tone arm 172. A stop member 186 limits the rotation of the seesaw lever 180 and, hence, fixes the movement of slide plate 184.

In the case where a 30-cm record is inserted in slot 2 plunger 142 is energized to pivot end 181a of lever 181 in a clockwise direction as viewed in FIG. 8. As a result, slide plate 184 is urged upwardly to a large extent against the action of spring 182. This limits the rotational range of tone arm 172 as lever 176 abuts against end 184b of slide plate 184 thus establishing a lead-in position of tone arm 172 for proper position on a 30-cm record. In the case where a 25-cm record is inserted, plunger 141 is energized urging slide plate 184 upwardly to a lesser extent as the shorter lever 180 is pivoted. Finally, where a 17-cm disc record is inserted neither plunger 141 or 142 is energized and slide plate 184 maintains the position shown in FIG. 8.

In this manner, the positional relationship of slide plate 184 to lever 176 of tone arm 172 is governed by the energized conditions of plungers 141 and 142 with the result that the lead-in position of the tone arm may be properly controlled for the record size being used.

Figure 10:
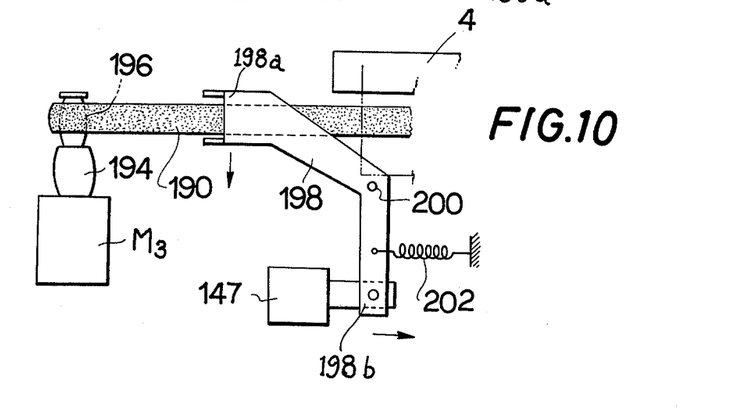
FIG. 10 is a side view of an essential part of one embodiment of a mechanism for changing the r.p.m. of a turntable from one preselected value to another.

FIG. 10 illustrates one preferred embodiment for changing the r.p.m. of the turntable from 45 to 33 r.p.m. Turntable 4 is driven through a belt 190 driven by motor $M_3$ which is provided with a large diameter pulley 194 and a small diameter pulley 196. A link member 198 having one end 198a engageable with belt 190 is rotatably supported on a shaft 200. Plunger 147, shown in FIG. 7, is coupled to the other end 198b of link 198. A spring 202 is secured to end 198b of link 198 to urge rotation of link 198 in a counterclockwise direction, as viewed in FIG. 10. Thus, in the case where a 30-cm record is inserted into slot 2, plunger 147 is energized pivoting link 198 in a clockwise direction against the force of spring 202. End 198a of link 190 moves correspondingly to bring belt 190 into engagement with the small diameter pulley 196 to rotate turntable 4 at 33 r.p.m. On the other hand, in the case where plunger 147 is not energized, link 198 is urged to rotate in a counterclockwise direction under the action of spring 202. Belt 190 is lowered by end 198a into engagement with the large diameter pulley 194 to rotate turntable 4 at 45 r.p.m.

As is apparent from the foregoing description, disc records of 30-cm, 25-cm, and 17-cm nominal outer diameters may be inserted into slot 2 as desired. The size of the record inserted is detected in slot 2 and turntable 4 is automatically placed in a mode so that the record is rotated at the proper r.p.m. Additionally, detection of the record size automatically adjusts the lead in for the tone arm so that it is guided onto the disc record at the correct predetermined drop point for the stylus.

It should be understood that the description given thus far refers to only one example of the mechanisms of centering means, size selecting means, and speed changing means, and thus various alterations, modifications and improvements may be inferred to those skilled in the art.

What is claimed is:

1. A phonograph record player comprising a housing having a slot for the insertion of a phonograph record therein, a turntable rotatably mounted within said housing for supporting a phonograph record, a tone arm within said housing for reproducing sound recorded on a phonograph record as the latter is rotated on said turntable, transport means within said housing extending from said slot to said turntable and being operative to transport a phonograph record from said slot onto said turntable, detecting means in the vicinity of said slot for detecting a phonograph record inserted in said slot, means responsive to said detecting means for causing operation of said transport means, centering means operative for establishing the concentric orientation of a phonograph record on the turntable with respect to the axis of rotation of the latter, means for effecting an operation of said centering means after said transport means has transported a phonograph record onto said turntable, turntable drive means for rotatably driving said turntable, and means for effecting operation of said turntable drive means upon completion of said operation of the centering means.

2. A phonograph record player according to claim 1; in which said means for effecting an operation of the centering means includes centering drive means, and delay means through which said centering drive means is made operative a predetermined time after said detecting means detect a phonograph record in said slot.

3. A phonograph record player according to claim 2; in which said centering drive means has an increased load imposed thereon upon said completion of the operation of said centering means, and said means for effecting operation of the turntable drive means includes means detecting said increased load imposed on said centering drive means.

4. A phonograph record player according to claim 1; in which said means for effecting an operation of the centering means includes centering drive means on which an increased load is imposed upon said completion of the operation of said centering means, and said means for effecting operation of the turntable drive means includes means detecting said increased load imposed on the centering drive means.

5. A phonograph record player according to claim 1; in which said centering means includes three guide members movable along respective, equally angularly spaced apart paths which extend radially in respect to said axis of the turntable, said guide members having radially inwardly facing contact surfaces engageable with the edge of a phonograph record on the turntable, and means urging said guide members to initial positions at equal, relatively large radial distances from said axis of the turntable so that a phonograph record of the largest size to pass through said slot can be transported onto said turntable between said contact surfaces; and said means for effecting an operation of said centering means includes a centering drive electric motor, and means activated by operation of said centering drive motor for moving said guide members equally inward from said initial positions toward said axis of the turntable.

6. A phonograph record player according to claim 5; in which the load on said centering drive motor increases when said contact surfaces of the guide members all engage the edge of a phonograph record on the turntable to prevent further inward movement of said guide members, and said means for effecting operation of the turntable drive means includes means detecting the increased load on said centering drive motor.

7. A phonograph record player according to claim 1; in which said detecting means includes a plurality of sensing means spaced apart along said slot for providing respective sensed signals in dependence on the size of a phonograph record inserted in said slot, and said means responsivwe to said detecting means for causing operation of said transport means includes drive circuit means for said transport means energized in response to the occurrence of any one of said sensed signals.

8. A phonograph record player according to claim 7; further comprising logic circuit means connected with said sensing means for providing record size indicating signals in response to said sensed signals, and means responsive to said record size indicating signals for deteriming respective lead-in positions for said tone arm.

9. A phonograph record player according to claim 8; further comprising means for determining the speed at which said turntable is driven by said turntable drive means in response to said record size indicating signals.

* * * * *